United States Patent [19]
Moser et al.

[11] Patent Number: 6,102,177
[45] Date of Patent: Aug. 15, 2000

[54] VISCOUS CLUTCH ASSEMBLY

[75] Inventors: George Moser, Wixom; Gordon Sommer, Plymouth; Patrick B. Usoro; Anthony L. Smith, both of Troy, all of Mich.

[73] Assignee: BEHR America, Inc., Walled Lake, Mich.

[21] Appl. No.: 09/414,130

[22] Filed: Oct. 8, 1999

Related U.S. Application Data

[63] Continuation of application No. 09/310,495, May 12, 1999, abandoned.

[51] Int. Cl.[7] .................................................. F16D 35/00
[52] U.S. Cl. ........................................ 192/21.5; 192/58.4
[58] Field of Search ............................... 192/21.5, 58.4, 192/58.61, 110 B; 188/267.1; 416/169 A

[56] References Cited

U.S. PATENT DOCUMENTS

| | | |
|---|---|---|
| 2,745,527 | 5/1956 | Winther .................................. 192/21.5 |
| 2,822,070 | 2/1958 | Jaeschke . |
| 2,870,888 | 1/1959 | Gill, Jr. . |
| 3,910,391 | 10/1975 | Detty et al. . |
| 3,993,415 | 11/1976 | Hauser . |
| 4,056,178 | 11/1977 | Detty . |
| 4,681,197 | 7/1987 | Pedu . |
| 4,739,864 | 4/1988 | Numazawa . |
| 5,377,798 | 1/1995 | Hudson et al. . |
| 5,598,908 | 2/1997 | York et al. . |
| 5,667,715 | 9/1997 | Foister . |
| 5,823,309 | 10/1998 | Gopalswamy et al. . |
| 5,845,752 | 12/1998 | Gopalswamy et al. . |
| 5,848,678 | 12/1998 | Johnston et al. . |
| 5,896,965 | 4/1999 | Gopalswamy et al. . |
| 5,960,918 | 10/1999 | Moser et al. ......................... 192/58.4 |
| 5,967,273 | 10/1999 | Hampton ............................. 192/21.5 |

*Primary Examiner*—Richard M. Lorence
*Attorney, Agent, or Firm*—Harness, Dickey & Pierce, PLC

[57] ABSTRACT

A viscous fluid clutch includes a housing which defines a chamber. A fan assembly is attached to the housing. A rotor is rotatably attached to the housing through a bearing. The bearing is disposed entirely within the chamber at a radially inner portion of the chamber. The viscous fluid is located within a radially outer portion of the chamber. The housing and the rotor form a labryinth passage between the outer portion of the chamber and the inner portion of the chamber. This labryinth passage encourages condensation of any oil vapors that may have formed at the shear point of the viscous fluid.

13 Claims, 5 Drawing Sheets

VISCOUS CLUTCH ASSEMBLY

This is a continuation of U.S. patent application Ser. No. 09/310,495, filed May 12, 1999 now abandoned.

FIELD OF THE INVENTION

The present invention relates generally to viscous fluid clutches for automotive fans. More particularly, the present invention relates to electrically controlled viscous clutch assemblies which utilize a magnetorheological (MR) fluid.

BACKGROUND OF THE INVENTION

The use of a viscous fluid clutch for controlling the rotation of an engine cooling fan for a vehicle is well known in the art. A multi-blade fan is removably secured to a viscous fan clutch installed between an accessory pulley (typically the water pump pulley) of a vehicle and a radiator. The viscous clutch is designed to drive the fan at high speeds which can approach the input speed of the viscous clutch which is normally the rotational speed of the engine. The operation of the viscous clutch is controlled based upon the engine's operating temperature to drive the fan approaching engine speeds when cooling is required and the viscous clutch permits the fan to operate at low speeds when cooling is not required. The thermostatic control of the fan through the clutch reduces airflow noise caused by fan rotation and load on the engine which provides the benefit of increased horsepower and improved fuel economy.

Generally, in the prior art clutches, a clutch plate housed within the clutch assembly, having lands and grooves, is mated to a housing having complimentary lands and grooves. An internally contained pump plate separates a working chamber from a reservoir. Gates in the pump plate permit selective flow of a viscous fluid from the reservoir to the working chamber and into a shear zone between the lands and grooves of the housing and the clutch plate. Fluid shear in the lands and grooves transfers input torque from the clutch plate to drive the housing and the attached fan.

When cooling is not required, gates in the pump plate are closed and the fluid in the shear zone is pumped into the working chamber. Orifices in the pump plate permit passage of the fluid from the working chamber to the reservoir. The removal of a majority of the fluid reduces the shear between the clutch plate and the housing, thereby substantially reducing the rotation of the housing and the attached fan.

The prior art viscous clutch systems which are thermostatically controlled rely on the temperature of the air passing through the radiator or the temperature of the cooling water of the engine to switch the on/off control for the fan. While these prior art viscous fan clutches have met with wide acceptance with the automotive and truck manufacturers, closer or more accurate control of the viscous fan clutches offer additional advantages to these manufacturers. Engine control management systems have been incorporated into most automotive and truck vehicles to control emissions, fuel economy as well as other engine operating characteristics. It would be advantageous to have a viscous fan clutch which could be controlled by the engine control management system and provide the ability to variably control the engagement of the clutch and thus the rotation of the fan.

SUMMARY OF THE INVENTION

The present invention provides the art with a viscous fan clutch which utilizes a magnetorheological (MR) fluid to transfer the driving source from the rotor to the stator and thus drive the fan. The MR fluid exhibits substantial increases in flow resistance (viscosity) when it is exposed to a suitable magnetic field. By having the ability to vary the magnetic field, the present invention provides a viscous fan clutch which provides a variable driving force dependent upon the strength of the magnetic field produced.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
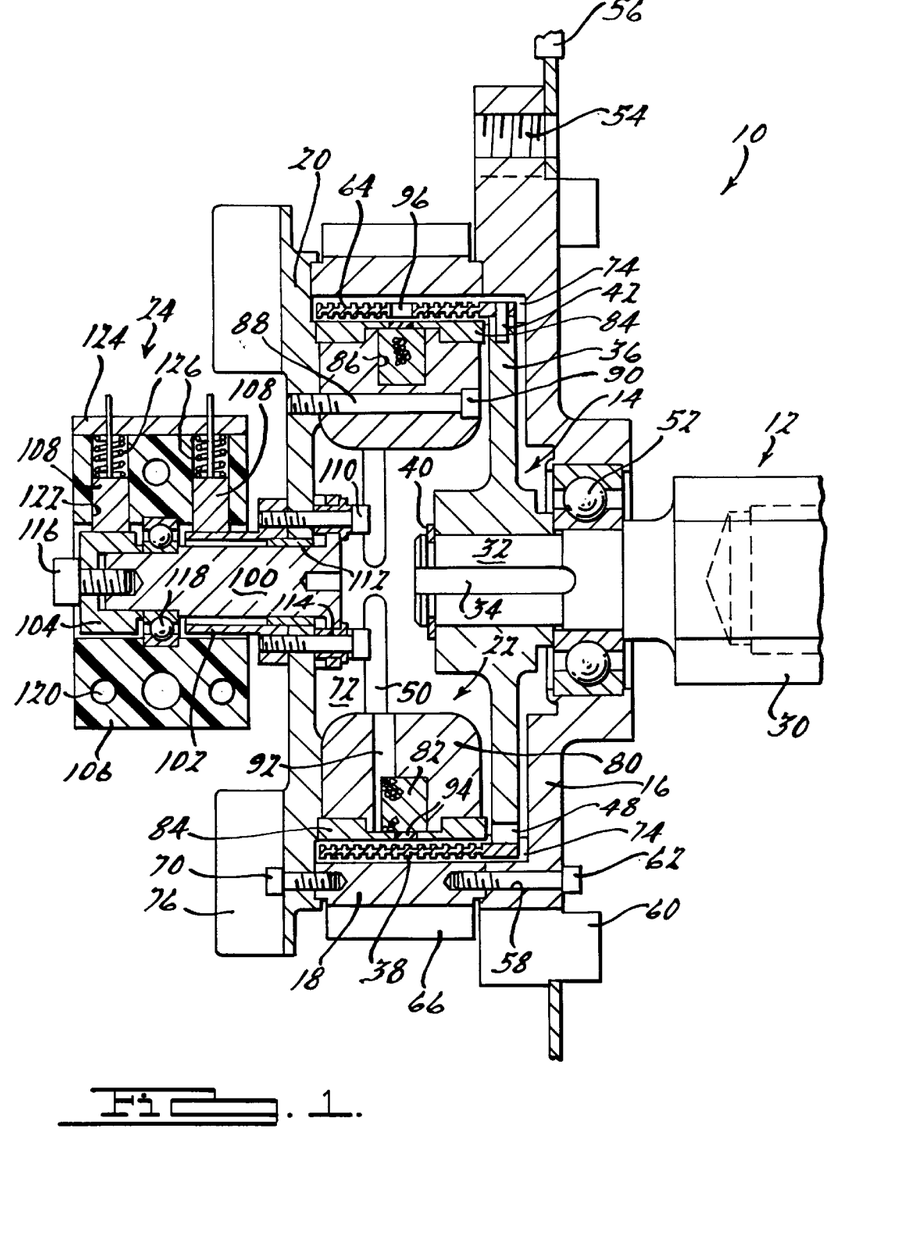
FIG. 1 is a side elevational view in cross section of a viscous fan clutch in accordance with the present invention.
Figure 2:
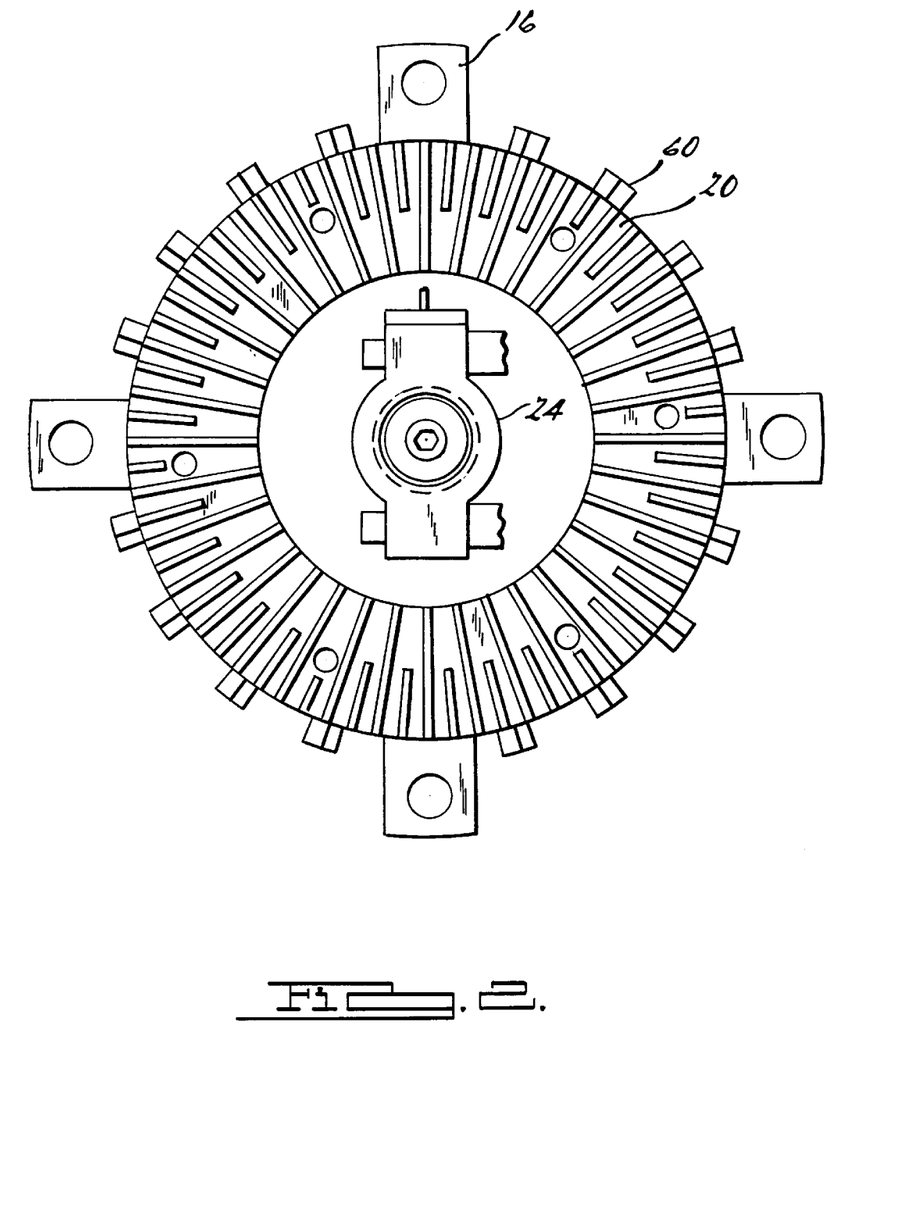
FIG. 2 is a front view of the viscous fan clutch shown in FIG. 1.

There is shown in FIGS. 1 and 2 a viscous fan clutch assembly in accordance with the present invention which is designated generally by the reference numeral 10. Clutch assembly 10 comprises an input shaft 12, a rotor assembly 14, a fan housing 16, a stator 18, a main housing 20, a coil assembly 22 and a slip ring assembly 24. Input shaft 12 is preferably manufactured from steel and is a cylindrical shaft which defines an input end 30 and an output end 32. Input end 30 is adapted to be fixedly secured to an output member of the engine which typically is the water pump. Output end 32 defines a key way 34 which is utilized to drivingly connect input shaft 12 to rotor assembly 14.

Figure 3:
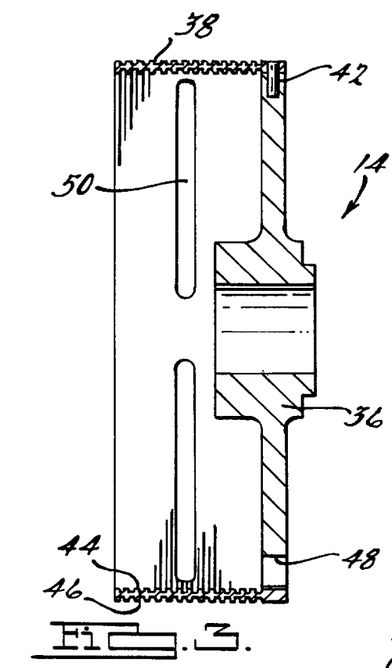
FIG. 3 is a side elevational view in cross section of the rotor assembly for the viscous fan clutch shown in FIG. 1.

Referring now to FIGS. 1 and 3, rotor assembly 14 includes a hub 36 and a rotor 38. Hub 36 is preferably manufactured from aluminum and is attached to output end 32 utilizing a key way (not shown) in hub 36 and a driving key (not shown) located within key way 34 and the key way in hub 36 as is well known in the art. A retaining ring 40 retains hub 36 on input shaft 12. Rotor 38 is preferably manufactured from steel and is fixedly secured to hub 36 using a plurality of dowels 42. The internal cylindrical surface of rotor 38 defines a right handed spiral groove 44 and the external cylindrical surface of rotor 38 defines a left handed spiral groove 46. Grooves 44 and 46 cooperate with a plurality of slots 48 formed in hub 36 to circulate fluid around rotor 38 as will be described later herein. Rotor 38 also defines a plurality of circumferentially extending slots 50 which permit the development of an acceptable magnetic field profile as will be discussed later herein.

Fan housing 16 is preferably manufactured from aluminum and is rotatably secured to input shaft 12 by a bearing 52. Fan housing 16 defines a first plurality of bores 54 which are adapted for securing a fan 56 to housing 16 and a second plurality of bores 58 for securing stator 18 to fan housing 16. Fan housing 16 includes a plurality of fins 60 which are curved as shown in FIGS. 1 and 2. The curvature of fins 60 operate as a fan for creating air flow around rotor assembly 14 and clutch assembly 10 which is located in the central area of fan 56. Fins 60 operate to dissipate heat generated by clutch assembly 10 as well as creating the air flow around clutch assembly 10.

Stator 18 is preferably manufactured from steel and is fixedly secured to fan housing 16 using a plurality of bolts 62. The interior surface of stator 18 is sized to mate with the exterior surface of rotor 38 to define a specified gap 64 between rotor 38 and stator 18. Stator 18 also defines a plurality of fins 66 which operate to dissipate heat generated by clutch assembly 10.

Main housing 20 is preferably manufactured from aluminum and is fixedly secured to stator 18 using a plurality of bolts 70. Main housing 20, stator 18 and fan housing 16 cooperate to define a chamber 72 within which is located rotor assembly 14, coil assembly 22 and magnetorheological fluid 74. Main housing 20 also defines a plurality of fins 76 which operate to dissipate heat generated by clutch assembly 10.

Coil assembly 22 comprises a coil body 80, coil windings 82 and a pair of coil rings 84. Coil body 80 is an annular member preferably manufactured from steel which defines an external groove 86 within which coil windings 82 are disposed. Coil body 80 includes a plurality of axial thru bores 88 which are utilized for securing coil assembly 22 to main housing 20 using a plurality of bolts 90. Coil body 80 further includes a radially extending bore 92 which provides access to windings 82 by slip ring assembly 24. Coil rings 84 are preferably manufactured from steel and are attached to the outer circumference of coil body 80 as is shown in FIG. 1. Coil rings 84 protect coil windings 82 as well as providing a path for the magnetic field. Once assembled to coil body 80, coil rings 84 define a gap 94 which is filled with epoxy. The outer diameter of coil rings 84 mates with the internal diameter of rotor 38 of rotor assembly to define a second specified gap 96.

Slip ring assembly 24 comprises a first slip ring shaft 100, a second slip ring shaft 102, a slip ring cap 104, a slip ring housing 106 and a pair of brushes 108. First and second slip ring shafts 100 and 102 are preferably manufactured from steel and are secured to main housing 20 using a plurality of bolts 110. An insulator 112 is disposed between first slip ring shaft 100 and main housing 20 to electrically insulate first slip ring shaft 100 from housing 20. An insulator 114 is disposed between each bolt 110 and first slip ring shaft 100 to electrically insulate first slip ring shaft 100 from main housing 20 and from second slip ring shaft 102. Second slip ring shaft 102 abuts and electrically communicates with main housing 20. Slip ring cap 104 is secured to the end of first slip ring shaft 102 by a bolt 116.

Slip ring housing 106 is manufactured from an insulating material and is rotatably secured to first slip ring shaft 100 by a bearing 118. Slip ring housing 106 is designed to remain stationary and incudes a plurality of threaded holes 120 which are used to attach slip ring housing 106 to a stationary object. Slip ring housing 106 defines a pair of rectangular bores 122 within each of which is disposed a respective brush 108. A cap 124 is attached to slip ring housing 106 to retain brushes 108. One brush 108 is biased towards slip ring cap 104 by a coil spring 126 and the other brush 108 is biased towards second slip ring shaft 102 by another coil spring 126. First slip ring shaft 100 is connected to one end of coil windings 82 by a connecting wire (not shown) and second slip ring shaft 102 is connected to the other end of coil windings 82 by a connecting wire (not shown). Thus, by supplying power to stationary brushes 108, coil windings 82 are powered to provide the necessary magnetic field.

During assembly of clutch assembly 10, a reduced amount of magnetorheological fluid 74 is required within chamber 72. The amount of fluid 74 which is necessary is the amount of fluid needed to fill gaps 64 and 96. The continued rotation of rotor assembly 14 maintains the distribution of fluid 74 within gaps 64 and 96 due to centrifugal force.

Referring now to FIG. 1, the operation of clutch assembly 10 will be described with clutch assembly first being in a released condition due to a lack of power being supplied to brushes 108. Input shaft 12 and rotor assembly 14 are rotating due to their connection with the output member of the engine. Fan 56 will be stationary or will rotate slowly depending on the viscosity of fluid 74 and the resistance to rotation of fan 56.

Fluid 74 is a magnetorheological (MR) fluid that has the ability to change its flow characteristics by several orders of magnitude and in times on the order of milliseconds under the influence of an applied magnetic field. MR fluids are non-colloidal suspensions of finely divided (typically one to one hundred micron diameter), low coercivity, magnetizable solids such as iron, nickel, cobalt and their magnetic alloys dispensed in a base carrier liquid such as mineral oil, synthetic hydrocarbon, water, silicone oil, esterified fatty acid or other suitable organic liquids. MR fluids have an acceptably low viscosity in the absence of a magnetic field but display large increases in their dynamic yield stress when they are subjected to a magnetic field.

When it is desired to rotate or power fan 56, power is supplied to brushes 108. The timing for supplying power and the amount of power to be supplied is determined by an exterior system which can be part of an engine control management system. As power is supplied to brushes 108, coil assembly 22 is activated and it creates a magnetic field which affects fluid 74 located within gaps 64 and 96. Slots 50 in rotor 38 ensure that the magnetic field created by coil assembly 22 travels through rotor 38 and through stator 18 to affect fluid 74 located within gap 64.

As the viscosity of fluid 74 increases, the shearing of fluid 74 within gaps 64 and 96 will transmit a driving torque from rotating rotor 38 to stator 18 and coil assembly 22. This in turn rotates main housing 20 and fan housing 16 with fan housing 16 rotating fan 56. If sufficient power is provided to coil assembly 22 through brushes 108, a direct drive between rotor assembly 14 and stator 18 and coil assembly 22 can be achieved. When it is desired not to drive fan 56, power to coil assembly 22 is terminated and fluid 74 returns to its low viscosity condition.

One problem which is associated with MR fluid 74 is that the dispersed solids within fluid 74 may have a tendency to migrate out of suspension within the base carrier. Spiral grooves 44 and 46 in conjunction with slots 48 in hub 36 function to maintain a circular movement of fluid 74 within gaps 64 and 96 and around rotor 38 to reduce and/or eliminate any tendency of the dispersed solids to migrate out of suspension with the base carrier.

Figure 4:
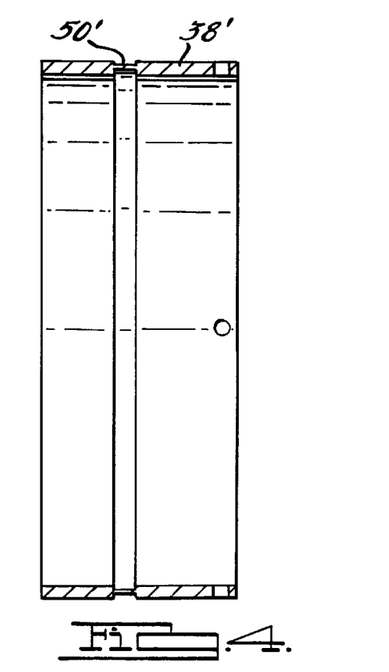
FIG. 4 is a side elevational view in cross section of a rotor in accordance with another embodiment of the present invention.

Referring now to FIG. 4, a rotor 38' in accordance with another embodiment of the present invention is disclosed. Rotor 38' is the same as rotor 38 but the plurality of circumferentially extending slots 50 have been replaced by a thin wall section 50'. Wall section 50' is small enough in thickness such that it does not provide a path to short the development of the magnetic field into gap 64 and stator 18. The function and operation of rotor 38' is identical to that of rotor 38. While rotor 38' in FIG. 4 is shown without spiral grooves 44 and 46, it is to be understood that spiral grooves 44 and 46 can be incorporated into rotor 38' if desired.

Figure 5:
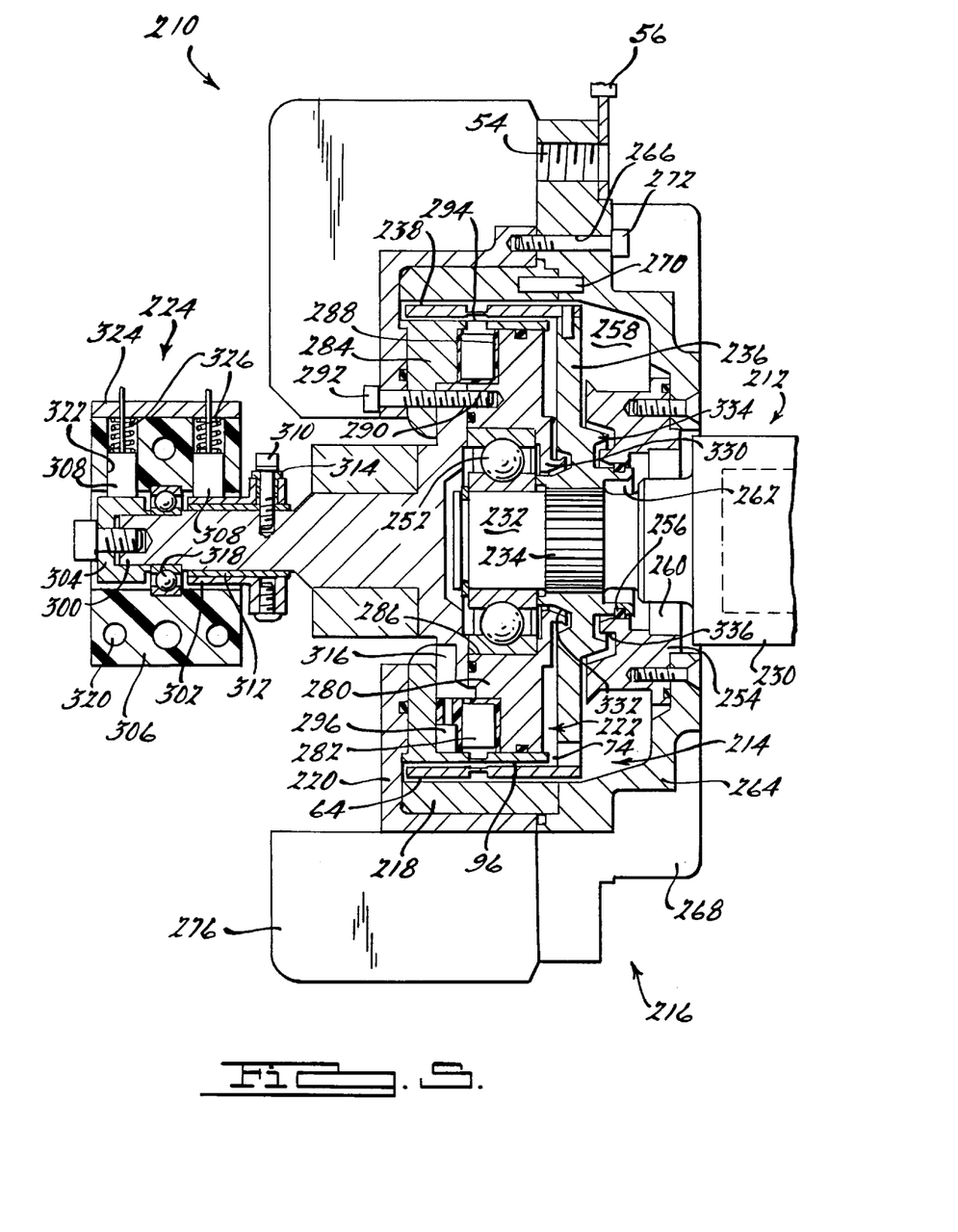
FIG. 5 is a side elevational view in cross section of a viscous fan clutch in accordance with another embodiment of the present invention.
Figure 6:
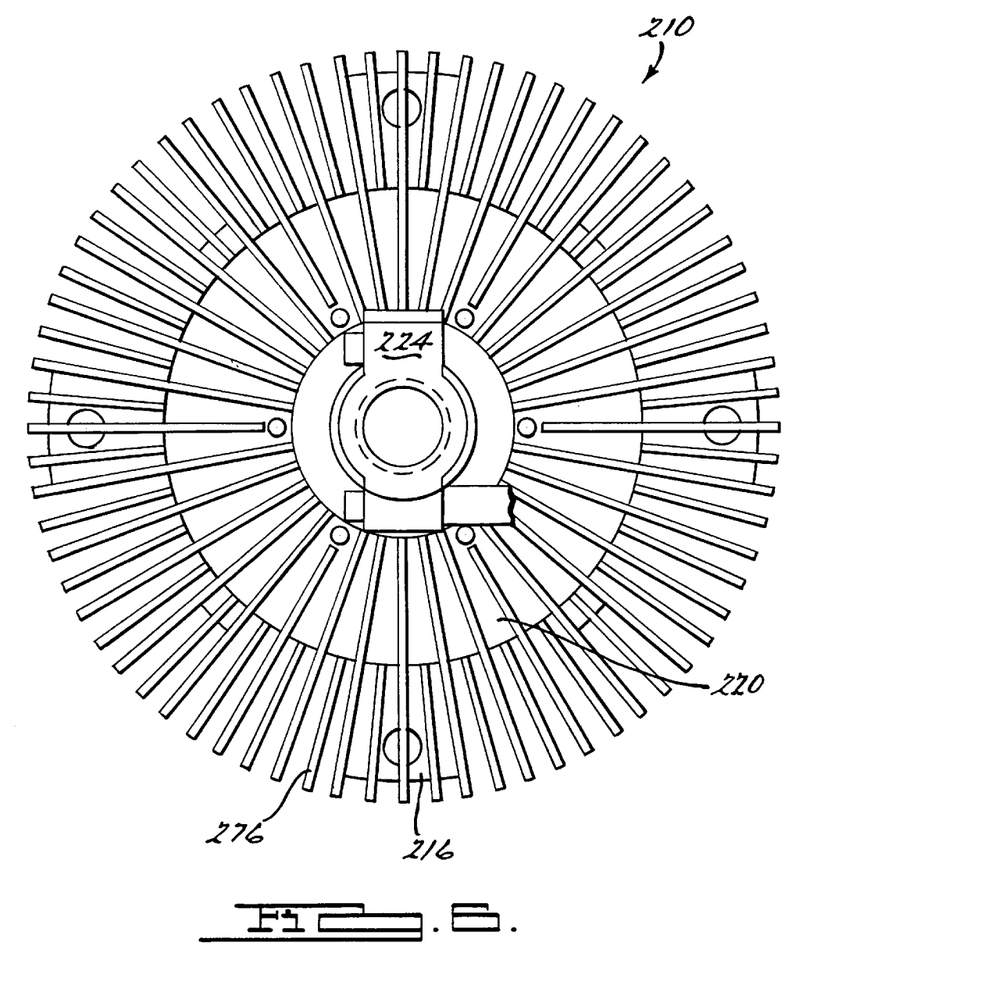
FIG. 6 is a front view of the viscous fan clutch shown in FIG. 5.
Figure 7:
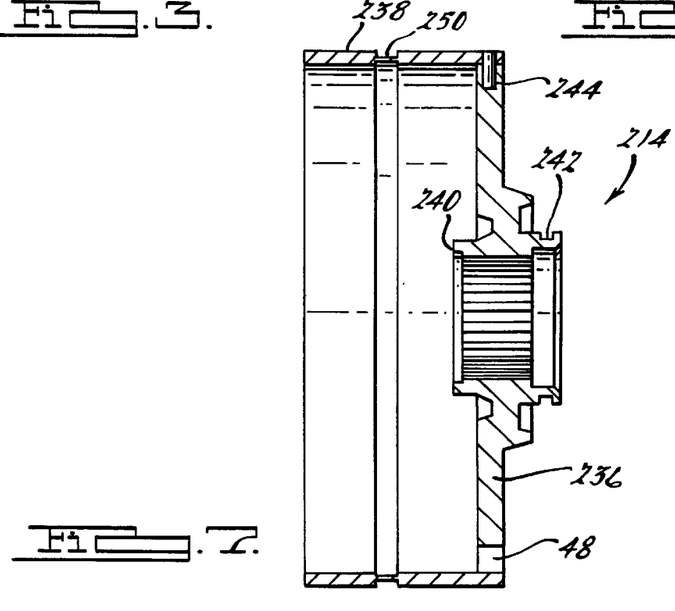
FIG. 7 is a side elevational view in cross section of the rotor assembly for the viscous fan clutch shown in FIG. 5.

Referring now to FIGS. 5–7, a clutch assembly 210 in accordance with another embodiment of the present invention is disclosed. Clutch assembly 210 comprises an input shaft 212, a rotor assembly 214, a fan housing 216, a stator 218, a main housing 220, a coil assembly 222 and a slip ring assembly 224. Input shaft 212 is preferably manufactured from steel and is a cylindrical shaft which defines an input end 230 and an output end 232. Input end 230 is adapted to be fixedly secured to an output member of the engine which is typically the water pump. Output end 232 defines a splined area 234 which is used to drivingly connect input shaft 212 to rotor assembly 214. Output end 232 rotatably supports coil assembly 222, main housing 220, stator 218 and fan housing 216 through a bearing 252.

Referring now to FIGS. 5 and 7, rotor assembly 214 includes a hub 236 and a rotor 238. Hub 236 is preferably manufactured from aluminum and is attached to output shaft end 232 by splined area 234. Hub 236 defines a bearing face 240 and a sealing ring groove 242 as will be discussed later herein. Rotor 238 is preferably manufactured from steel and is fixedly secured to hub 236 using a plurality of dowels 244. While not specifically illustrated, the internal cylindrical surface of rotor 238 can define right handed spiral groove 44 and the exterior surface of rotor 238 can define left handed spiral groove 46 if desired. As stated above, grooves 44 and 46 cooperate with the plurality of slots 48 in hub 236 to circulate fluid around rotor 238. Rotor 238 defines a thin wall section 250 which is small enough in thickness such that it does not provide a sufficient path to short the development of the magnetic field into stator 18. Optionally, a plurality of slots 50 can be used to permit the development of an acceptable magnetic field profile.

Fan housing 216 is a two piece housing preferably manufactured from aluminum. An inner housing 254 rotates with respect to rotor assembly 214. A sealing ring 256 is disposed within sealing ring groove 242 and rides against inner housing 254 to seal a chamber 258 defined by input shaft 212, fan housing 216, main housing 220, coil assembly 222 and slip ring assembly 224. A seal 260 is disposed between inner housing 254 and input shaft 212 to seal a chamber 262. Chamber 262 is preferably filled with silicon grease for lubrication and sealing purposes. An outer housing 264 is attached to inner housing 254 by a plurality of bolts and it defines the plurality of bores 54 which are adapted for securing fan 56 to housing 216 and a second plurality of bores 266 for securing fan housing 216 to main housing 220. Outer housing 264 of fan housing 216 includes a plurality of fins 268 which operate as a fan for creating air flow around clutch assembly 210. Fins 268 operate to dissipate heat generated by clutch assembly 210 as well as creating the air flow.

Stator 218 is preferably manufactured from steel and is fixedly secured to fan housing 216 using a plurality of pins 270. The interior surface of stator 218 is sized to mate with the exterior surface of rotor 238 to define the specified gap 64 between rotor 238 and stator 218. The exterior surface of stator 218 is designed to mate with main housing 220.

Main housing 220 is preferably manufactured from aluminum and is fixedly secured to fan housing 216 using a plurality of bolts 272. Main housing 220 is a cup shaped housing within which stator 218 is received. Main housing 220 partially forms chamber 258 within which magnetorheological fluid 74 is disposed. Main housing 220 also defines a plurality of fins 276 which operate to dissipate heat generated by clutch assembly 210.

Coil assembly 222 comprises a coil body 280, coil windings 282 and a coil ring 284. Coil body 280 is an annular member preferably manufactured from steel which defines an internal pocket 286 which accepts bearing 252. Coil body 280 also defines an annular groove 288 within which coil windings 282 are disposed. Coil body 280 includes a plurality of threaded bores 290 which are utilized for securing coil assembly 222 to main housing 220 using a plurality of bolts 292. Coil ring 284 is preferably manufactured from steel and is attached to coil body 280 by the plurality of bolts 292. Coil ring 284 is a cup shaped member which is positioned over coil windings 282 in order to seal coil winding 282 from chamber 258. Coil ring 284 defines a thin wall section 294 which is small enough in thickness such that it does not provide a sufficient path to short the development of the magnetic field into stator 218. Coil ring 284 also defines a bore 296 which provides access to windings 282 by slip ring assembly 224. The outer diameter of coil ring 284 mates with the internal diameter of rotor 238 of rotor assembly 214 to define the second specified gap 96.

Slip ring assembly 224 comprises a first slip ring shaft 300, a second slip ring shaft 302, a slip ring cap 304, a slip ring housing 306 and a pair of brushes 308. First and second slip ring shafts 300 and 302 are preferably manufactured from steel with first ring shaft 300 being secured to main housing 220 and coil assembly 222 by the plurality of bolts 292. Second slip ring shaft 302 is secured to first slip ring shaft 300 by a bolt 310. An insulator 312 is disposed between first slip ring shaft 300 and second slip ring shaft 302 to electrically insulate one from the other. An insulator 314 is disposed between bolt 310 and second slip ring shaft 302 to electrically insulate first slip ring shaft 300 from second slip ring shaft 302. First slip ring shaft 300 defines a bore 316 which with bore 296 provides access to windings 282 by slip ring assembly 224. Slip ring cap 304 is secured to the end of first slip ring shaft 302 by a bolt threaded into the end of shaft 300.

Slip ring housing 306 is manufactured from an insulating material and is rotatably secured to first slip ring shaft 300 by a bearing 318. Slip ring housing 306 is designed to remain stationary and it includes a plurality of threaded holes 320 which are used to attach slip ring housing 306 to a stationary object. Slip ring housing 306 defines a pair of rectangular bores 322 within each of which is disposed a respective brush 308. A cap 324 is attached to slip ring housing 306 to retain brushes 308. One brush 308 is biased against slip ring cap 304 by a coil spring 326 and the other brush 308 is biased against second slip ring shaft 302 by another coil spring 326. First slip ring shaft 300 is connected to one end of winding 282 by a connecting wire (not shown) and second slip ring shaft 302 is connected to the other end of coil windings 282 by a connecting wire (not shown). Thus, by supplying power to stationary brushes 308, coil windings 282 are energized to create the necessary magnetic field.

During assembly of clutch assembly 210, a reduced amount of magnetorheological fluid 74 is required within chamber 258. The amount of fluid 74 which is necessary is only the amount of fluid required to fill gaps 64 and 96. The continued rotation of rotor assembly 214 maintains the distribution of fluid 74 within gaps 64 and 96 due to centrifugal force.

Referring now to FIG. 5, the operation of clutch assembly 210 will be described with clutch assembly first being in a released condition due to a lack of power being supplied to brushes 308. Input shaft 212 and rotor assembly 214 are rotating due to their connection with the output member of the engine. Fan 56 will be stationary or will rotate slowly depending on the viscosity of fluid 74 and the resistance to rotation of fan 56.

Fluid 74 is a magnetorheological (MR) fluid that has the ability to change its flow characteristics by several orders of magnitude and in times on the order of milliseconds under the influence of an applied magnetic field. MR fluids are non-colloidal suspensions of finely divided (typically one to one hundred micron diameter), low coercivity, magnetizable solids such as iron, nickel, cobalt and their magnetic alloys dispensed in a base carrier liquid such as mineral oil, synthetic hydrocarbon, water, silicone oil, esterified fatty acid or other suitable organic liquids. MR fluids have an acceptably low viscosity in the absence of a magnetic field but display large increases in their dynamic yield stress when they are subjected to a magnetic field.

When it is desired to rotate or power fan 56, power is supplied to brushes 308. The timing for supplying power and the amount of power to be supplied is determined by an exterior system which can be part of an engine control management system. As power is supplied to brushes 308, coil assembly 222 is activated and it creates a magnetic field which affects fluid 74 located within gaps 64 and 96. Thin wall sections 250 and 294 in rotor 238 and coil ring 284 ensure that the magnetic field created by coil assembly 222 travels through rotor 238 and through stator 218 to affect fluid 74 located within gap 64.

As the viscosity of fluid 74 increases, the shearing of fluid 74 within gaps 64 and 96 will transmit a driving torque from rotating rotor 238 to stator 218 and coil assembly 222. This in turn rotates main housing 220 and fan housing 216 with fan housing 216 rotating fan 56. If sufficient power is provided to coil assembly 222 through brushes 308, a direct drive between rotor assembly 214 and stator 218 and coil assembly 222 can be achieved. When it is desired not to drive fan 56, power to coil assembly 222 is terminated and fluid 74 returns to its low viscosity condition.

One of the differences between clutch assembly 210 and clutch assembly 10 is the location of bearing 252 of clutch assembly 210 versus the location of bearing 52 of clutch assembly 10. Bearing 52 is mounted on steel input shaft 12 and in aluminum housing 16. Bearing 252 is mounted on steel input shaft 212 and in steel coil body 280. The steel/steel mounting for bearing 252 provides additional support for the bearing rather than the steel/aluminum mount for bearing 52. In addition, the axial positioning of bearing 252 is more centralized than the axial positioning of bearing 52.

Another advantage to the position of bearing 252 over bearing 52 is that bearing 252 is disposed entirely within chamber 258 whereas bearing 52 actually forms a boundary for chamber 72. During the operation of clutch assembly 10, it is believed that the shearing of magnetorheological fluid 74 by rotor 38 creates excessive heat at the surface of rotor 38. The magnetorheological fluid being approximately 55% oil reacts to the excessive heat by having a portion of the oil vaporized. The vaporized oil which also contains a portion of the iron particles tends to migrate through bearing 52. The addition of key way 34 helps in the migration of this vaporized oil. Life testing of clutch assembly 10 has shown a loss in the amount of magnetorheological fluid 74 from the assembly as well as traces of iron particles within bearing 52.

Clutch assembly 210 has been designed to overcome these issues relating to clutch assembly 10. First of all, bearing 252 is located entirely within chamber 258 thus eliminating the possibility of the oil vapor migrating through the bearing. In addition, coil body 280 includes an annular extension 330 which extends into an annular groove 332 on hub 236. Hub 236 includes an annular extension 334 which extends into an annular groove 336 in inner housing 254. Each of these annular extension 330 and 334 in cooperation with their respective grooves 332 and 336 create a labyrinth path for any vaporized oil created at the interfaces of rotor 238. By creating this labyrinth path, the vaporized oil will have an opportunity to cool and thus condense prior to engaging the boundaries of chamber 258. Finally, chamber 262 is filled with a silicon grease to lubricate the various surfaces as well as providing an additional seal for chamber 258.

While the above detailed description describes the preferred embodiment of the present invention, it should be understood that the present invention is susceptible to modification, variation and alteration without deviating from the scope and fair meaning of the subjoined claims.

What is claimed is:

1. A viscous fluid clutch for a fan assembly, said viscous fluid clutch comprising:

a housing defining a chamber, said housing adapted for being attached to said fan assembly;

a shaft partially disposed within said chamber and extending from said housing;

a rotor disposed within said chamber, said rotor being secured to said shaft;

a coil assembly secured to said housing and disposed within said chamber, said coil assembly being disposed coaxially with respect to said rotor;

a bearing disposed entirely within said chamber, said bearing being disposed between said coil assembly and said shaft for rotatably supporting said rotor with respect to said housing;

a viscous fluid disposed within said chamber between said rotor and said housing, said rotor transmitting driving torque to said stator by shearing said viscous fluid; and means for supplying electrical power to said coil assembly.

2. The viscous fluid clutch according to claim 1, wherein said rotor and said housing define a first specified gap, said viscous fluid being disposed within said first specified gap.

3. The viscous fluid clutch according to claim 2, wherein said rotor and said coil assembly define a second specified gap, said viscous fluid being disposed within said second specified gap.

4. The viscous fluid clutch according to claim 1, wherein said housing comprises a stator, said stator and said rotor defining a first specified gap, said viscous fluid being disposed within said first specified gap.

5. The viscous fluid clutch according to claim 4, wherein said coil assembly further comprises a coil ring, said coil ring and said rotor defining a second specified gap, said viscous fluid being disposed within said second specified gap.

6. The viscous fluid clutch according to claim 5, wherein said coil assembly further includes a coil body, said bearing being disposed between said coil body and said shaft.

7. The viscous fluid clutch according to claim 1, wherein said coil assembly comprises a coil ring, said coil ring and said rotor defining a specified gap, said viscous fluid being disposed within said specified gap.

8. The viscous fluid clutch according to claim 7, wherein said coil assembly further comprises a coil body, said bearing being disposed between said coil body and said shaft.

9. The viscous fluid clutch according to claim 1, wherein said coil assembly comprises a coil body, said bearing being disposed between said coil body and said shaft.

10. The viscous fluid clutch according to claim 1, wherein said housing comprises a main housing and a fan housing, said fan housing adapted for being attached to said fan assembly.

11. The viscous fluid clutch according to claim 1, wherein said chamber includes a radially inner portion and a radially outer portion, said bearing being entirely disposed within said radially inner portion of said chamber.

12. The viscous fluid clutch according to claim 10, wherein said viscous fluid is disposed within said radially outer portion of said chamber, said housing and said rotor defining a first labyrinth passage between said radially outer and said radially inner passage.

13. The viscous fluid clutch according to claim 12, wherein said housing and said rotor define a second labyrinth passage between said viscous fluid and said bearing.

* * * * *